US008293362B2

(12) United States Patent
Huston et al.

(10) Patent No.: US 8,293,362 B2
(45) Date of Patent: Oct. 23, 2012

(54) CLOSED-CELL FOAM SILICA

(75) Inventors: Alan L Huston, Aldie, VA (US); Brian L Justus, Springfield, VA (US)

(73) Assignee: The United States of America, as represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 12/846,200

(22) Filed: Jul. 29, 2010

(65) Prior Publication Data
US 2010/0310444 A1 Dec. 9, 2010

Related U.S. Application Data

(62) Division of application No. 11/798,976, filed on May 18, 2007, now Pat. No. 7,788,949.

(51) Int. Cl.
B32B 3/00 (2006.01)
B32B 3/26 (2006.01)
C03C 3/06 (2006.01)
C04B 38/00 (2006.01)

(52) U.S. Cl. ............... 428/312.6; 501/54; 501/80
(58) Field of Classification Search .......... 501/80–85, 501/54; 428/312.6
See application file for complete search history.

(56) References Cited

U.S. PATENT DOCUMENTS 2,890,127 A * 6/1959 Ford ........................... 501/39
3,717,486 A * 2/1973 Fukumoto et al. ............. 501/80

OTHER PUBLICATIONS

Tomita et al. A Novel Preparation Method for Foamed Silica Ceramics by Sol-Gel Reaction and Mechanical Foaming. Journal of Porous Materials 11: 107-115, 2004.*

* cited by examiner

*Primary Examiner* — Noah Wiese
(74) *Attorney, Agent, or Firm* — Amy L. Ressing; Stephen T. Hunnius

(57) ABSTRACT

A closed-cell foam glass structure comprising a multitude of micron-sized voids enclosed by interconnected glass membranes with sub-micron thickness wherein the voids are from about 30% to about 70% of the volume.

4 Claims, 2 Drawing Sheets

CLOSED-CELL FOAM SILICA

BACKGROUND

This application is a divisional application of, and claims priority to, U.S. patent application Ser. No. 11/798976 filed on May 18, 2007 the entirety of which is herein incorporated by reference.

The present invention relates to foam glass and more specifically to closed-cell foam silica.

Foam glasses are widely used in industry as lightweight, insulating materials. An example of a foam glass is Pittsburgh Corning FOAMGLAS (registered trademark). This material is composed of millions of individually sealed, micron-sized cells. This is called a closed-cell structure and offers a number of advantages over open cell foam glass structures.

Open cell foam glass structures can absorb moisture and other chemicals, greatly reducing the insulating efficiency of the foam glass. If an open cell foam glass absorbs a flammable material, it can act as a candle wick and can represent a serious fire hazard. If an open cell structure absorbs a corrosive chemical, the large surface area of the open cells can result in rapid corrosion.

Closed cell structures are largely impermeable to most liquids and gases and thus can be moisture-resistant and corrosion-resistant. For example, FOAMGLAS (registered trademark) can be used for outdoor and underground applications and can operate at temperatures up to 480C.

Foam glasses are typically made using alkali metal silicate glasses. These glasses are fabricated by mixing, for example, alumina, boric acid, small silica particles and an alkali metal oxide with a cellulating agent to form a pulverulent homogeneous mixture as discussed in U.S. Pat. No. 4,192,664, the entire contents of which is herein incorporated by reference. The mixture is heated to a temperature that causes the cellulating agent to gasify, or vaporize, forming a foam glass with a cellular structure.

Although closed-cell foam glasses with high silica content are desirable, only open cell foam glasses having high silica content are typically reported as in U.S. Pat. No. 3,945,816. the entire contents of which is herein incorporated by reference. This foam silica was prepared by first fabricating a foam phase-separable alkali metal borosilicate glass, then heat treating the foam to separate the silica-rich and boron-rich phases, and finally leaching the boron-rich phase away using an acid etchant.

Open-cell foam silica can also be made using sol-gel techniques. This involves cooling of the liquid to cause gellation and phase separation followed by supercritical drying to remove the solvent and produce an open cell structure.

DETAILED DESCRIPTION

Figure 1:
FIG. 1 shows a SEM micrograph of the cell structure of the glass at 542× magnification.
Figure 2:
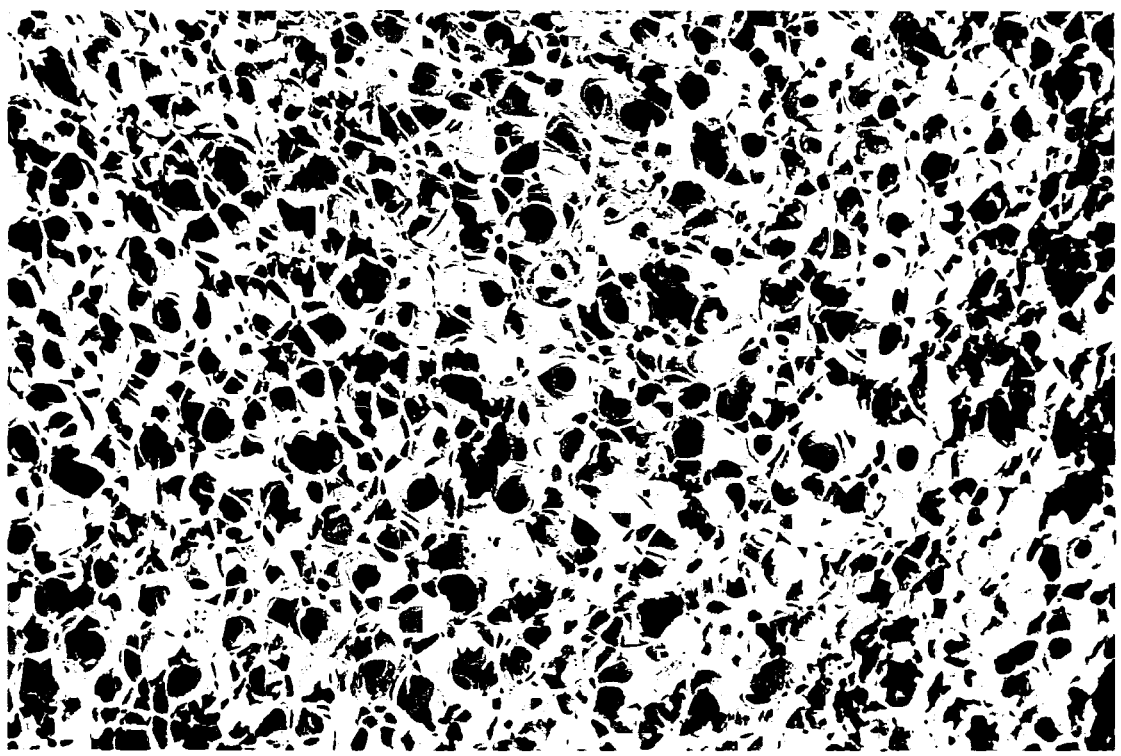
FIG. 2 show a SEM micrograph of the cell structure of the glass at 162× magnification.

The closed-cell foam glass structure can consist of a multitude of micron-sized voids enclosed by interconnected glass membranes with sub-micron thickness. The closed cell foam glass structure can have a composition that is greater than 95% $SiO_2$. The voids within the closed cell foam glass structure can represent greater than 70% of the volume of the structure.

The method of manufacture of closed-cell silica foam is described in detail in this section. The method can be subdivided into five steps: 1: diffusion of a substance into a porous glass substrate to form an impregnated substrate, said substance being capable of forming a gas upon heating; 2: sealing said impregnated glass substrate inside of a container; 3: heating the sealed container to a first temperature sufficient to cause the impregnated substance to form a gas to create a pressure inside of the sealed container that is greater than one atmosphere; 4: heating the sealed container to a second, higher temperature sufficient to cause the pores within the porous glass to collapse resulting in trapping or sealing the gaseous substance within the formerly porous substrate resulting in a solid, non-porous glass substrate, 5: removal of the solid glass substrate from the sealed container and heating the solid glass substrate to a temperature sufficient to soften the glass causing expansion of the glass due to the expansion of trapped gasses within the solid glass substrate.

EXAMPLE 1

An example of one method for the fabrication of foam silica is outlined in detail.

An example of Step 1—An example of the step of incorporation of inorganic salts throughout a porous silica substrate is provided. The preparation of the foam glass can begin with the diffusion of an inorganic salt such as calcium nitrate tetrahydrate ($Ca(NO_3)_2.4H_2O$) into a porous glass substrate. A commercially available porous glass (Corning 7930) can be used that consists of a network of interconnected pores with diameters of approximately 40 A and a void volume of approximately 30%.

Step 2—The $Ca(NO_3)_2.4H_2O$ impregnated glass can be dried and then sealed inside of a fused quartz tube that is similar in size to the porous glass substrate.

An example of Step 3—The temperature can be slowly raised to approximately 600 C. The $Ca(NO_3)_2.4H_2O$ decomposes to $Ca(NO_3)_2$, at a temperature of 132 C, releasing water vapor. At a temperature of 561 C the $Ca(NO_3)_2$ melts and further heating leads to decomposition to form CaO and various nitrogen oxide gasses. The gasses released during the heating process can cause the pressure inside of the sealed container to reach several atmospheres.

Step 4—Further heating to a temperature of approximately 850 C causes the pores in the glass to begin to collapse (referred to as consolidation) trapping the high pressure gasses in the glass. Heating to a temperature of about 1100 C assures that the porous glass substrate is fully consolidated. The sample can then cooled to room temperature and then removed from the sealed container. The consolidated glass can be slightly smaller in volume than the starting porous glass.

An example of Step 5—A step of expansion at elevated temperature to yield a closed-cell silica foam is provided. The consolidated glass can be then placed inside of an oven and the temperature can be raised to 1100 C. As the glass begins to soften, the trapped gasses in the glass can expand causing the glass to expand, forming a closed-cell foam structure. The resulting "foam glass" can have the appearance of white chalk and can have a bulk density of less than 0.3 $g/cm^3$.

Various factors such as the internal pressure, the external pressure and the temperature can determine the final cell structure and density of the glass.

The specific example given above of the five-step method for the fabrication of foam silica glass is only meant to be illustrative of the general method. Many other specific approaches can also be used.

EXAMPLE 2

An example of a second method for the fabrication of foam silica is outlined in detail.

A solution was prepared containing 1.0 g $Zn(NO_3)_2 \cdot 5H_2O$ in 100 ml of water with 1 ml concentrated $HNO_3$. A 0.25 inch diameter by 3 inch long rod of porous Vycor glass (Type 7930) was placed in the solution for a period of 24 hours to allow complete diffusion of the solution throughout the glass rod. The rod was removed from solution and allowed to dry in air for a period of 24 hours.

A second solution containing 2 grams of thioacetamide in 100 ml of solution plus 1 ml of concentrated $HNO_3$ was prepared and heated to approximately 100 C. The rod containing the $Zn(NO_3)_2$ salt was then placed into the solution for a period of 3 hours to allow the $Zn(NO_3)_2$ to react with the $H_2S$ that was formed by the decomposition of thioacetamide, forming nanocrystallites of ZnS.

The rod containing the ZnS nanocrystallites was removed from solution and dried for approximately 24 hours in air. The rod was then placed in a furnace and heated 100 C and maintained for 24 hours for complete drying. The ZnS-doped rod was then placed in a thick-walled fused quartz tube, approximately 0.5 inches ID and 8 inches long that was sealed at one end.

The tube was then evacuated to a pressure of a few millitorr and sealed using a hydrogen-oxygen torch. The sealed tube containing the doped rod was then placed inside a furnace and raised to a temperature of 1150 C at a rate of 5 C per minute and held at 1150 C for a period of approximately 1 hour. The sealed tube was allowed to cool to room temperature and the doped rod was removed from the tube by cutting the tube.

The doped rod now had an opaque whitish-gray appearance with dimensions slightly smaller than the starting porous glass rod which was due to the consolidation of the pores at the elevated temperature. The density of the rod was approximately 2 $g/cm^3$. The rod was then placed inside of the furnace and the temperature was raised to 1150 C for 10 minutes. During this heating process, the rod expanded in all directions resulting in a low density (~0.3 $g/cm^3$), cylindrical, white glass material that had the appearance of styrfoam or chalk.

Example 3. An alternative method for the expansion of the foam glass can involve rapidly expanding the consolidated, formerly porous, glass at a temperature of 1100 C. Instead of cooling the fused quartz container, the container can be fractured at high temperature. The sudden drop in pressure results in a very rapid expansion of the consolidated rod. This method of expansion results in a smoother, more uniform appearance of the surface of the foam glass.

As previously noted, a method of manufacture of foam silica as taught in this disclosure can provide a closed-cell structure. A closed-cell structure can be critical for providing moisture-resistance and corrosion-resistance. No other glass foams with high silica content have a closed-cell structure. The cell membranes can be very thin and the cell diameters can range in size from less than 1 micron to more than 20 microns.

Also as previously noted, a foam glass made primarily from silica can be used to thermally protect materials from much higher temperatures than alkali silicate glass foams. Silica foam can be used at temperatures above 800 C while silicate glass foams can only be used to ~480 C.

The above description is that of a preferred embodiment of the invention. Various modifications and variations are possible in light of the above teachings. It is therefore to be understood that, within the scope of the appended claims, the invention may be practiced otherwise than as specifically described. Any reference to claim elements in the singular. e.g., using the articles "a," "an," "the." or "said" is not construed as limiting the element to the singular.

What we claim is:

1. A closed-cell foam silica comprising:
   an inorganic salt incorporated into a porous glass substrate having a density of from about 0.1 $g/cm^3$ to about 0.3 $g/cm^3$;
   wherein said porous glass substrate has a void volume of approximately 70% and a cell diameter of from about 1 micron and to about 20 microns.

2. The closed-cell foam silica of claim 1 that can withstand temperatures up to 1100 C without deterioration.

3. The closed-cell foam glass structure of claim 2 wherein the composition of said glass is greater than 95% $SiO_2$ by weight.

4. The closed-cell foam glass structure of claim 3 includes a multitude of micron-sized voids enclosed by interconnected glass membranes with sub-micron thickness.

* * * * *